United States Patent Office 3,515,971
Patented June 2, 1970

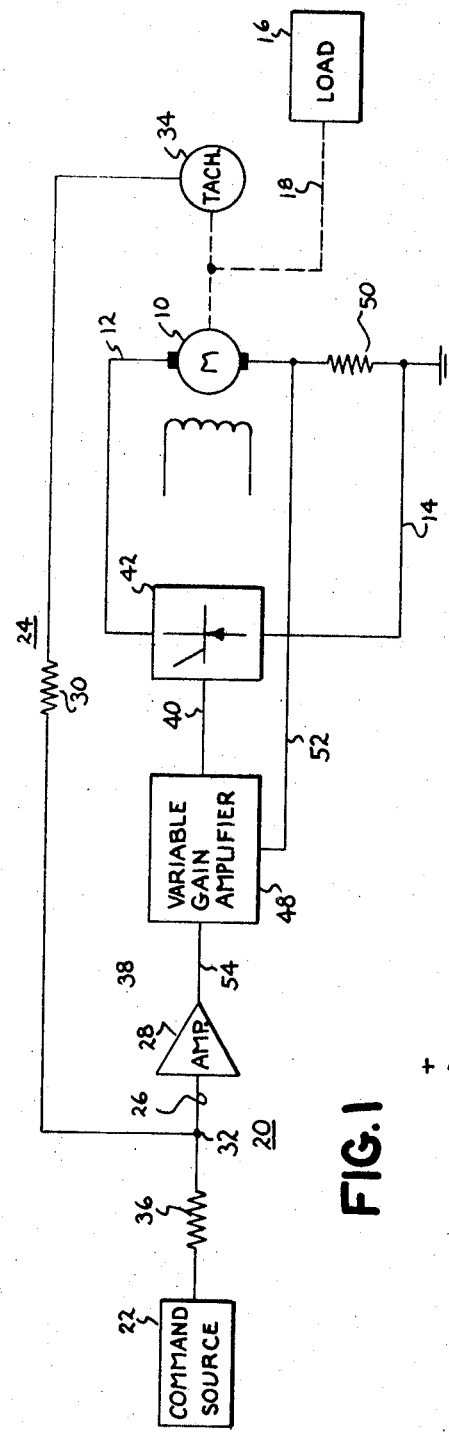
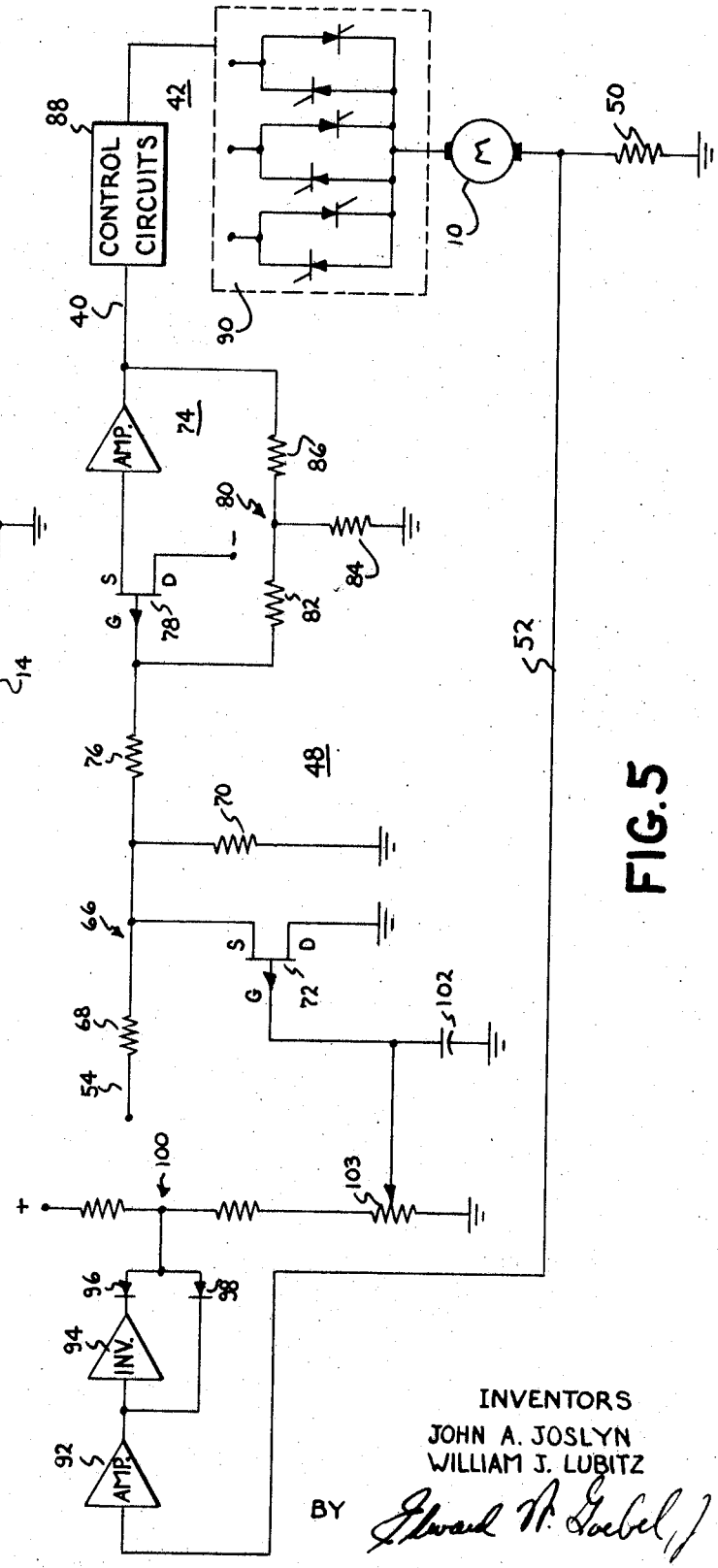

---

3,515,971
MOTOR CONTROL SYSTEM WITH FEEDBACK AND VARIABLE GAIN AMPLIFIER RESPONSIVE TO CURRENT
John A. Joslyn and William J. Lubitz, Dalton, Mass., assignors to General Electric Company, a corporation of New York
Filed Sept. 7, 1967, Ser. No. 666,061
Int. Cl. H02p 5/00, 7/24
U.S. Cl. 318—308                                6 Claims

---

ABSTRACT OF THE DISCLOSURE

Relates to obtaining a linear response from motor control systems when controlled rectifiers contained in phase controlled power amplifiers for these systems are fired at small firing angles, that is, when their firing is in a retarded condition during any half-cycle of an alternating-current input voltage. In order to linearize the relationship between the magnitude of motor current produced for various input signal voltage levels, a voltage amplifier having a gain which, at these small firing angles, varies non-linearly with the magnitude of the motor current, is placed between a source of these input signals and the power amplifier itself. In one embodiment of this invention, the gain of this voltage amplifier is appropriately varied by allowing a signal proportional to the magnitude of the motor current to control the source-to-drain resistance of a field effect transistor in an input attenuator circuit of the voltage amplifier.

---

BACKGROUND OF THE INVENTION

This invention relates to motor control systems, and more particularly, to motor control systems using phase controlled power amplifiers. The invention herein described was made in the course of or under a contract or subcontract thereunder with the Department of the Navy.

Phase controlled power amplifiers are being used in motor control systems for controllably supplying direct-current electrical energy from alternating-current sources to direct-current drive motors. The amount of energy supplied to a drive motor is varied by changing the firing angles of controlled rectifiers contained in these power amplifiers. When the firing of these controlled rectifiers is retarded until late in a half-cycle of the applied A.C. voltage, a small amount of energy is supplied to the motor. The amount of energy supplied to the drive motor is increased by advancing the firing of the controlled rectifiers.

Experience with phase controlled power amplifiers has shown that they have inherent non-linearities when the firing of their controlled rectifiers is in a retarded condition. For small firing angles of these controlled rectifiers, the transfer function or gain of the power amplifier, that is the relationship between the magnitude of the output motor current produced at various voltage levels of the input signal to the power amplifier, varies over a wide range in a non-linear fashion. Therefore, it becomes very difficult to analyze the performance of a motor control system of this type by conventional methods, such as by using Bode diagrams. These non-linearities in performance become even more serious for closed loop motor control systems in which they might cause instabilities resulting in oscillation of these systems. Numerous attempts have been made to correct these non-linearities at the small firing angles, but each of these heretofore has resulted in the introduction of another non-linearity into the system.

The small or retarded firing angles in question can be defined for any drive system as those angles at which one or both of the principal reasons for the non-linear variation in the transfer function occur: the sinusoidal shape of the A-C source voltage and the inductive nature of the load of the power amplifier. With regard to the first of these reasons, the sinusoidal shape of the A-C voltage applied to the controlled rectifiers of the power amplifier, a change in the firing angle of the controlled rectifiers near the point where the sinusoidal A-C voltage crosses its zero axis, when the firing is either highly advanced or highly retarded, produces a small change in the average output voltage applied to the drive motor. Near the peak of the sinusoidal voltage wave, an identical change in the firing angle produces a much larger change in the average voltage applied to the motor. This difference in the average voltage applied to the motor accounts for some of the non-linearity in the transfer function of the power amplifier in the retarded firing range to which this invention pertains.

The second source of non-linearity of the phase controlled power amplifier is the inductive nature of its load, the drive motor. When the firing angles of the controlled rectifiers are sufficiently advanced, the time constant of the motor causes the continuous flow of armature current. The average voltage applied to the armature is determined by the magnitude of the A-C supply voltage forward biasing the controlled rectifiers after they are fired. However, during the retarded firing range in question, the motor current flow is discontinuous, beginning after the controlled rectifiers are fired and continuing for a time after the applied voltage is less than the voltage generated by the rotation of the motor. The next controlled rectifier to carry the motor current is not fired until after the current has stopped flowing. For the short time that the applied voltage is less than motor generated voltage, power is returned to the A-C voltage source. The A-C voltage during this time must be subtracted from the forward biasing A-C voltage to obtain the average voltage applied to the drive motor, thus causing the non-linearities which this invention overcomes.

It is an object of this invention to provide an improved motor control system having a phase controlled power amplifier which responds linearly to input signals which require the activation of the controlled rectifiers at small firing angles.

It is another object of this invention to provide a motor control system which compensates for inherent gain variations of its phase controlled power amplifier.

Briefly stated, and in accordance with one aspect of this invention, a motor control system includes means for varying the magnitude of the actuating signals of a phase controlled power amplifier as a function of the magnitude of its output current to compensate for gain variations of the power amplifier, particularly those occurring at small firing angles of controlled rectifiers contained by the power amplifier.

BRIEF DESCRIPTION OF DRAWINGS

FIG. 1 is a block diagram of a motor control system made in accordance with the principles of this invention;

FIG. 5 shows a partial schematic diagram of a portion of a motor control system made in accordance with the principles of this invention.

SPECIFICATION

Figure 2:
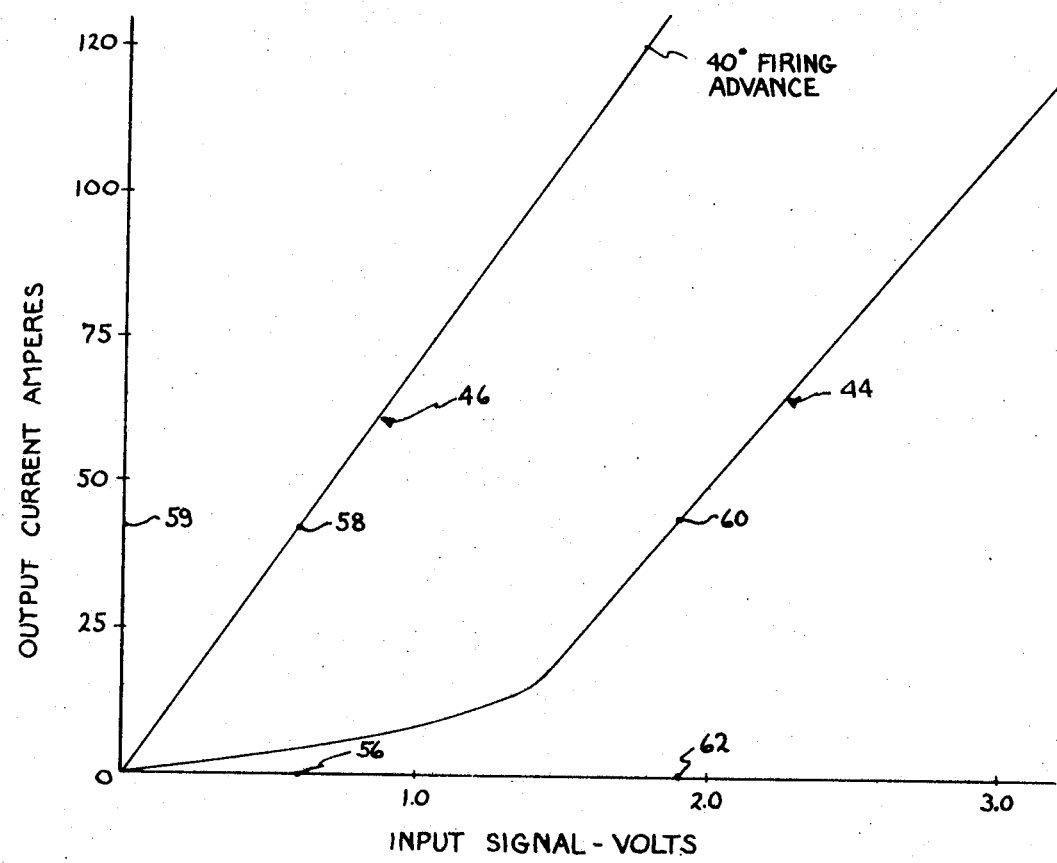
FIG. 2 is a graph showing the desired transfer function of a phase controlled power amplifier for motor control systems and showing the transfer function of a typical power amplifier.

Referring now in more detail to the drawings, FIG. 1 shows a motor control system which is compensated for the inherent nonlinearities in the gain of the phase controlled power amplifiers in accordance with the principles of this invention. In the motor control system shown, a drive motor such as direct-current motor 10 is energized through conductors 12 and 14 to drive a load 16 through coupling means 18.

The performance of the drive motor 10 is controlled by means of a regulator 20 which compares reference signals from a command source 22 and feedback signals from a feedback network 24 to produce error signals at a conductor 26, at the input of an operational amplifier 28. The command source 22 may comprise any convenient means for generating reference signals having a magnitude proportional to the desired performance of the drive motor 10. For example, it may comprise a regulated power supply, a computer, a tachometer generator driven by a master drive system, etc. The reference signals may be reversible in polarity or may have a single polarity, depending on the desired operation of the controlled motor.

Negative feedback signals, proportional to the regulated output of the drive motor 10, are coupled through a feedback resistor 30 to a summation point 32 of the regulator 20. For illustrative purposes, the regulated characteristic of the motor 10 is motor speed, and thus the feedback loop 24 includes a tachometer generator 34 coupled to the drive motor 10 to generate direct-current signals proportional to the speed of the motor 10. The regulated output may be output torque, position of the load, etc., in each instance requiring an appropriate feedback signal.

The difference between the current flow through the resistor 30, caused by the feedback signal, and the current flow through a resistor 36, caused by the reference signal, produces an error signal at the summation point 32 and the conductor 26. This error signal is used to control the performance of the drive motor 10.

In accordance with this invention, the regulator 20 is included in means 38 for providing actuating signals at a conductor 40 in the input circuit of a phase controlled power amplifier 42. A phase controlled power amplifier of the type referred to in the specification and claims usually includes either one or a plurality of controlled rectifying devices for applying electrical energy from an alternating-current source to a device such as the drive motor 10. It also includes control circuits for turning on the controlled rectifying devices at various phase angles of the applied A-C voltage to control the amount of energy applied to the motor.

In FIG. 2, a curve 44 shows a typical transfer function of a power amplifier, in which the output current from the amplifier is plotted against the actuating voltage at the input of the amplifier. The curve 46 shows the desired transfer function of the power amplifier 42. It should be noted that at the small firing angles, when the firing of the controlled rectifiers is retarded, the slope of the curve 44 changes in a non-linear fashion, showing that the gain of the phase controlled power amplifier is changing.

In further accordance with the principles of this invention, the means 38 for supplying actuating signals include means for varying the magnitude of the actuating signals at these small firing angles as a function of the magnitude of the armature current to compensate for this variation in the transfer function of the power amplifier 42. Those skilled in the art will recognize that many different means can be provided for varying the magnitude of the actuating signals as a function of the magnitude of the armature current. However, in the illustrated embodiment of this invention, this means includes an amplifier 48 having a gain which varies as a function of the level of the output current of the power amplifier 42. A low resistance sampling resistor 50 is connected in series with the motor 10 to provide a signal proportional to the magnitude of the armature current of the motor 10 and thus proportional to the magnitude of output current from the power amplifier. The signal level across the resistor 50 is coupled through a conductor 52 to vary the gain of the amplifier 48 and thereby vary the magnitude of the power amplifier actuating signals at the conductor 40.

The curves 44 and 46 of FIG. 2 are used to compute the characteristics of the non-linear amplifier 48. For illustrative purposes, point 56 is chosen on the abscissa of the graph in FIG. 2 showing one input signal level for the non-linear amplifier 48. Moving in a vertical upward direction, this signal level crosses the desired power amplifier curve at a point 58. Moving horizontally to the left from point 58, the desired output current level at this input signal level is shown at point 59 on the ordinate of the graph. The actuating signal level necessary to cause the power amplifier 42 to provide the desired output current is found by moving horizontally to the right from point 58 to a point 60 on curve 44, and then vertically to a point 62 on the abscissa.

Figure 3:
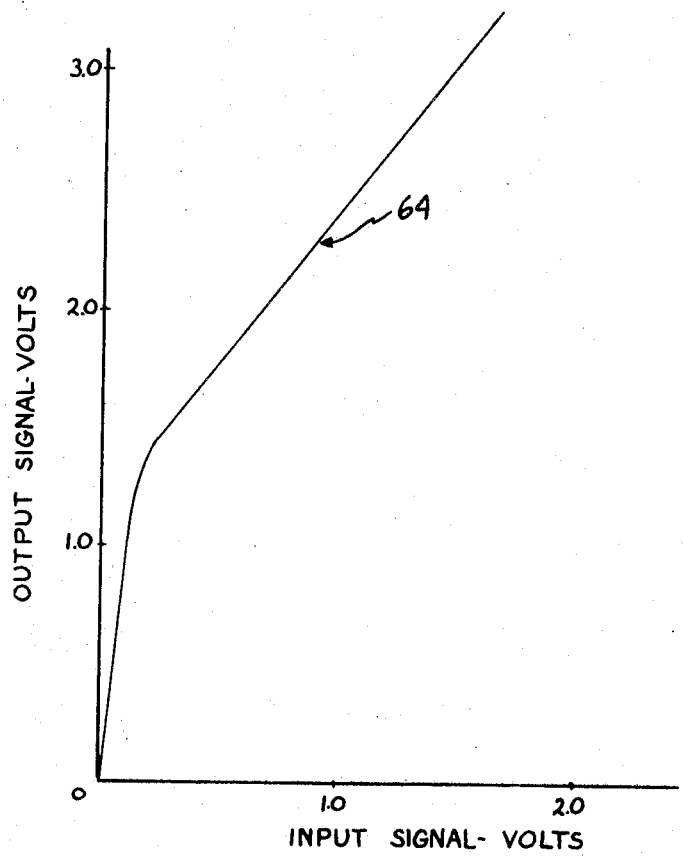
FIG. 3 is a graph showing the transfer function of a variable gain amplifier used in a motor control system in accordance with this invention.

In other words, referring to FIGS. 1 and 2, when the voltage level of the input signal of the amplifier 48 equals that shown at point 56, the linearization of the characteristics of the power amplifier 42 requires an output current level shown at point 59. To provide this output current level, the actuating signal for the power amplifier 42 must have a voltage level indicated by point 62. The characteristics required for the amplifier 48 are produced by repeating this procedure over the operating range of the power amplifier 42. These characteristics are shown by a curve 64 in FIG. 3.

Figure 4:
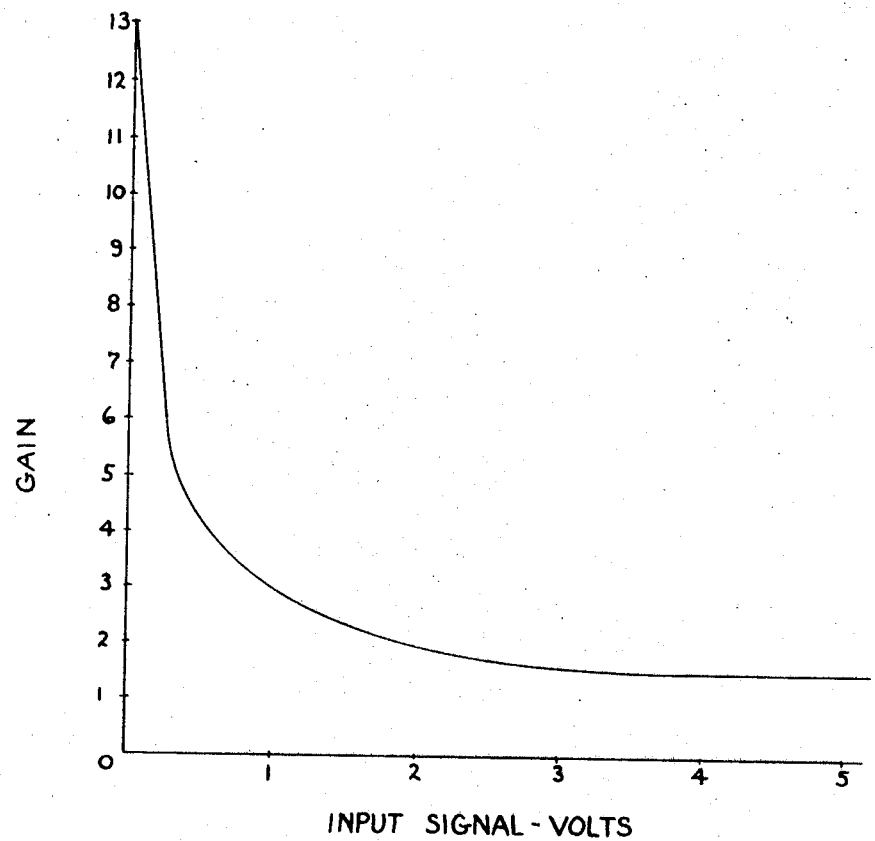
FIG. 4 is a graph showing the non-linearities of the gain of the variable gain amplifier used in accordance with this invention.

FIG. 4 shows how the gain or transfer function of the amplifier 48 must vary over a range of its input signal voltage levels to produce actuating signals for linearizing the response of the power amplifier 42. Each input signal level represents a desired magnitude of the output current from the power amplifier 42. Therefore, in accordance with this invention, changes in the gain of the amplifier 48 are made to follow the changes in the magnitude of the power amplifier output current. This results in the linearization of the transfer function describing the relationship between the magnitude of the output current produced by the power amplifier 42 at various voltage levels of the input signal at conductor 54.

FIG. 5 shows an embodiment of this invention where the gain of the variable gain amplifier is appropriately varied by taking advantage of the characteristics of a field effect transistor. The variable resistance of a field effect transistor operated in the "triode region" of its characteristics, that is, in the range of small drain-to-source voltages before operation in its more linear "pinch-off region," approximates the characteristics of a variable resistance shunt resistor needed to control the gain of a variable gain amplifier in accordance with this invention. A signal proportional to the magnitude of the motor current energizes the gate electrode of the field effect transistor in the input circuit of a voltage amplifier, controlling drain-to-source resistance of this amplifier and thereby varying the gain of this amplifier in a manner which causes the amplifier to compensate for the gain variation of the power amplifier. Elements common to the circuits of FIGS. 1 and 5 are identified with the same numerals.

In FIG. 5, the conductor 54, leading from the error signal amplifier 28 of FIG. 1 (not shown) is connected to an input network 66 of a voltage amplifier 74, the network comprising resistors 68 and 70 and a field effect transistor 72. The resistor 68 provides a large attenuation of the input signal to keep the drain-to-source voltage low on the field effect transistor 72 as the transistor controls the gain of the amplifier 48.

A resistor 76 and a field effect transistor 78 prevent the loading of the input network 66 by raising the input impedance of the circuit following this network. The field effect transistor 78 is highly stable with changes in temperature as well. A feedback network 80 comprising resistors 82, 84 and 86 ensures that the amplifier 74 has a high gain without using unnecessarily high feedback resistors for the amplifier.

The power amplifier 42 includes control circuits 88 and controlled rectifiers 90, shown in a 3-phase, half-wave configuration which can energize the motor 10 for movement in either of its two directions of rotation. The control circuits 88 may include, for example, firing circuits for each of the controlled rectifiers 90, as well as an inverter for changing the polarity of the actuating signals to one of the oppositely conducting sets of the controlled rectifiers.

A signal proportional to the magnitude of the motor current is coupled from the resistor 50 and through the conductor 52, an amplifier 92, an inverter 94, and diodes 96 and 98 to a voltage divider 100. A filter capacitor 102 is connected to the slide wire of a potentiometer 103 at the gate of the field effect transistor 72. The signal at the gate of the transistor 72 is proportional to the absolute value of the magnitude of the motor current, since the inverter 94 and diodes 96 and 98 convert signals of either polarity across the resistor 50 to negative-going signals. These negative signals control the gate-source bias on the field effect transistor 72, varying the drain-to-source resistance of this transistor to control the gain of the amplifier 48. The filter capacitor 102 smooths the signals at the gate of the field effect transistor 72 at low motor speeds when the motor current is discontinuous.

The gain of the non-linear amplifier circuit 48 of FIG. 5 can be calculated as:

$$G_{48} = \frac{R}{r_{68}+R}(G_{74}) \quad (1)$$

$$R = \frac{(r_{DS})(r_{70})}{r_{DS}+r_{70}} \quad (2)$$

$G_{48}$=gain of the non-linear amplifier 48,
$G_{74}$=gain of the voltage amplifier 74,
$r_{68}$=resistance of the resistor 68,
$r_{70}$=resistance of the resistor 70, and
$r_{DS}$=resistance from drain-to-source of the unijunction transistor 72.

Using FIG. 4, along with Equations 1 and 2 above, the field effect transistor 72 should have characteristics which allow the gain of the amplifier 48 to closely follow the curve of FIG. 4, in response to the motor current, as the voltage level of the input signal changes. When variable gain operation of the amplifier 48 is required, in the range of the small firing angles, the amplified motor current signal from the resistor 50 biases the field effect transistor 72 for operation in the triode region of its characteristics. For larger firing angles, the transistor 72 is biased for minimum source-to-drain resistance and therefore minimum gain as shown in FIG. 4.

This invention is not limited to the particular details of the preferred embodiments illustrated. It is contemplated that various modifications and applications within the scope of this invention will occur to those skilled in the art. For example, means other than the preferred variable gain amplifier 48 can be used to vary the magnitude of the actuating signals of the phase controlled power amplifier 42 as a function of the magnitude of the amplifier output current. Where a variable gain amplifier circuit is used, as in FIG. 1, the gain of this amplifier can be appropriately varied by means other than the field effect transistor 72 shown in FIG. 5. This transistor can be eliminated, for example, and a light sensitive or magnetic flux sensitive resistor can be substituted for the resistor 84 and its resistance varied as a function of the magnitude of the motor current by means for producing light or a magnetic field having an intensity or magnitude which varies as a function of the magnitude of the power amplifier output current.

It is therefore intended that the appended claims cover such modifications and applications which do not depart from the direct scope and spirit of this invention.

What we claim is new and desire to secure by Letters Patent of the United States is:

1. A motor control system comprising, in combination:
 (a) drive motor means;
 (b) power amplifier means including controlled rectifier means for applying electrical energy from an alternating-current source to said motor means;
 (c) first means for supplying actuating signals to said power amplifier, said first means including a regulator which combines reference signals from a command source and feedback signals from a feedback source to aid in producing the actuating signals;
 (d) said first means also including second means for causing the magnitude of the actuating signals to be varied as a function of the magnitude of the armature current to compensate for gain variations of said power amplifier means at small firing angles of said controlled rectifiers means, and said second means comprising a variable gain amplifier having a gain which varies as a function of the magnitude of the armature current.

2. A motor control system comprising, in combination:
 (a) drive motor means;
 (b) power amplifier means including controlled rectifier means for applying electrical energy from an alternating-current source to said motor means;
 (c) first means for supplying actuating signals to said power amplifier, said first means including a regulator which combines reference signals from a command source and feedback signals from a feedback source to aid in producing the actuating signals;
 (d) said first means also including second means for causing the magnitude of the actuating signals to be varied as a function of the magnitude of the armature current to compensate for gain variations of said power amplifier means at small firing angles of said controlled rectifiers means, and said second means includes an amplifier and a variable impedance device connected to an input circuit of said amplifier, the impedance of said variable impedance device being controllable in response to the magnitude of the armature current for varying the gain of said amplifier in a manner which compensate for the gain variations of said power amplifier.

3. A motor control system comprising, in combination:
 (a) drive motor means;
 (b) power amplifier means including controlled rectifier means for applying electrical energy from an alternating-current source to said motor means;
 (c) first means for supplying actuating signals to said power amplifier, said first means including a regulator which combines reference signals from a command source and feedback signals from a feedback source to aid in producing the actuating signals;
 (d) said first means also including second means for causing the magnitude of the actuating signals to be varied as a function of the magnitude of the armature current to compensate for gain variations of said power amplifier means at small firing angles of said controlled rectifiers means, and said second means includes an amplifier and a variable impedance device connected in a feedback network of said amplifier, the impedance of said variable impedance device being controllable in response to the magnitude of the armature current for varying the gain of said amplifier in a manner which compensates for the gain variations of said power amplifier.

4. For use in a motor control system comprising drive motor means; power amplifier means including controlled rectifier means connectable to an alternating current source for applying electrical energy to said motor means; and first means for supplying actuating signals to said power amplifier, said first means including a regulator which combines reference signals from a command source and feedback signals from a feedback source to aid in producing the actuating signals, the improvement wherein said motor control system also includes: means responsive to the output of said regulator for varying the magnitude of the actuating signals as a function of the magnitude of the armature current to compensate for gain variations of said power amplifier means at small retarded firing angles of said controlled rectifiers means, and said means for varying the magnitude of the actuating signals comprises, a variable gain amplifier having a gain which varies as a function of the magnitude of the armature current to compensate for the gain variations of said power amplifier means.

5. The improved motor control system according to claim 4 wherein the gain of said variable gain amplifier is changed by means of a variable resistance device having a resistance which changes as a function of the magnitude of the armature current.

6. The improved motor control system according to claim 5 wherein said variable resistance device comprises a field effect transistor connected in an input circuit of amplifier means included in said variable gain amplifier.

References Cited

UNITED STATES PATENTS 2,858,495 10/1958 Shrider _____ 318—308
3,086,156 4/1963 Geissing _____ 318—308

ORIS L. RADER, Primary Examiner

R. J. HICKEY, Assistant Examiner

U.S. Cl. X.R.
318—332